US012654747B2

(12) United States Patent
Kim

(10) Patent No.: US 12,654,747 B2
(45) Date of Patent: Jun. 16, 2026

(54) METHOD AND APPARATUS FOR CONTROLLING SPEED OF AUTONOMOUS VEHICLE

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 183 days.

(21) Appl. No.: 18/380,808

(22) Filed: Oct. 17, 2023

(65) Prior Publication Data

US 2024/0326870 A1     Oct. 3, 2024

(30) Foreign Application Priority Data

Mar. 27, 2023     (KR) ........................ 10-2023-0039951

(51) Int. Cl.
*B60W 60/00*         (2020.01)
*B60W 10/08*         (2006.01)
(Continued)

(52) U.S. Cl.
CPC ...... *B60W 60/00184* (2020.02); *B60W 10/08* (2013.01); *B60W 10/184* (2013.01);
(Continued)

(58) Field of Classification Search
CPC ........... B60W 60/00184; B60W 10/08; B60W 10/184; B60W 30/18109; B60W 30/18172; B60W 2510/083; B60W 2510/18; B60W 2520/10; B60W 2520/26;

B60W 2520/28; B60W 2552/40; B60W 2554/00; B60W 2710/083; B60W 2710/18; B60W 2720/10; B60W 2720/106; B60W 60/001; B60W 30/143; B60W 40/068; B60W 60/0016; B60W 30/08; B60W 40/04;
(Continued)

(56) References Cited

U.S. PATENT DOCUMENTS 5,355,717 A * 10/1994 Tanaka .................. B60T 8/1706
                                                                701/80
2003/0078717 A1* 4/2003 Kawasaki ............... B60T 8/172
                                                                701/80
(Continued)

*Primary Examiner* — Jelani A Smith
*Assistant Examiner* — Alyssa Rorie
(74) *Attorney, Agent, or Firm* — Morgan, Lewis & Bockius LLP

(57)     ABSTRACT

An apparatus for controlling a speed of an autonomous vehicle, includes: a sensor unit for measuring a speed of a wheel of the vehicle; a control unit for controlling the speed of the vehicle by generating a driving signal or a braking signal; and a torque applying unit for applying wheel torque to the wheel based on the driving signal or the braking signal. The control unit is configured to calculate a slip ratio based on the speed of the wheel, determine a road surface condition based on the wheel torque and the slip ratio, determine a maximum speed of the vehicle based on the road surface condition, and control the speed of the vehicle not to exceed the maximum speed. The road surface condition is classified according to a friction coefficient of the road surface, and the wheel torque is braking torque or driving torque applied to the wheel.

14 Claims, 4 Drawing Sheets

(51) Int. Cl.
*B60W 10/184* (2012.01)
*B60W 30/18* (2012.01)

(52) U.S. Cl.
CPC ................. *B60W 30/18109* (2013.01); *B60W 30/18172* (2013.01); *B60W 2510/083* (2013.01); *B60W 2510/18* (2013.01); *B60W 2520/10* (2013.01); *B60W 2520/26* (2013.01); *B60W 2520/28* (2013.01); *B60W 2552/40* (2020.02); *B60W 2554/00* (2020.02); *B60W 2710/083* (2013.01); *B60W 2710/18* (2013.01); *B60W 2720/10* (2013.01); *B60W 2720/106* (2013.01)

(58) Field of Classification Search
CPC ....... B60W 2520/30; B60W 2554/802; B60W 2720/26; B60Y 2300/18175
See application file for complete search history.

(56) References Cited

U.S. PATENT DOCUMENTS

| | | | | |
|---|---|---|---|---|
| 2011/0137531 | A1* | 6/2011 | Noguchi | B60K 23/0808 |
| | | | | 701/54 |
| 2013/0345917 | A1* | 12/2013 | Ozaki | B60L 3/106 |
| | | | | 701/22 |
| 2015/0251658 | A1* | 9/2015 | Kato | B60L 3/102 |
| | | | | 701/22 |
| 2018/0093565 | A1* | 4/2018 | Kondo | B60K 23/0808 |
| 2019/0382010 | A1* | 12/2019 | Woodley | B60W 30/146 |
| 2020/0257292 | A1* | 8/2020 | Zhao | B60Q 9/00 |
| 2021/0188258 | A1* | 6/2021 | Goto | B60W 30/0956 |
| 2022/0063626 | A1* | 3/2022 | Kaneko | B60L 7/16 |
| 2022/0126868 | A1* | 4/2022 | Yim | B60W 60/007 |
| 2023/0047444 | A1* | 2/2023 | Henderson | B60T 8/175 |
| 2023/0347892 | A1* | 11/2023 | Sugiyama | B60W 40/04 |
| 2024/0092363 | A1* | 3/2024 | Zhao | B60W 30/18018 |

* cited by examiner

<u>1</u>

METHOD AND APPARATUS FOR CONTROLLING SPEED OF AUTONOMOUS VEHICLE

CROSS-REFERENCE TO RELATED APPLICATIONS

The present application claims priority to Patent Application No. 10-2023-0039951, filed on Mar. 27, 2023 in Korea, the entire contents of which are incorporated herein by reference.

TECHNICAL FIELD

The present disclosure relates to a method and apparatus for controlling the speed of an autonomous vehicle. More specifically, it relates to a method and apparatus for controlling the speed of an autonomous vehicle and improving driving safety.

BACKGROUND

The content described in this section only provides background information about the present disclosure and does not make up prior art.

A self-driving vehicle refers to a vehicle that makes a decision on driving by itself without the intervention of a human driver. Specifically, a self-driving vehicle makes, by itself, a decision on acceleration and deceleration, braking, a distance from surrounding vehicles, a lane change, etc. As the technological level of an autonomous driving system increases, a human driver's intervention decreases.

Autonomous driving or autonomous driving systems defined in the present disclosure include all types of autonomous driving, from partially autonomous driving that partially requires a human driver's operation to fully autonomous driving that does not require a human driver's operation at all. In other words, all the five levels of autonomous driving are included. Here, at Level 1, because an autonomous driving system merely serves to assist a human driver, the human driver's intervention is highly required during driving. At Level 5, an autonomous driving system makes all decisions on driving, so a human driver's operation is not required at all.

Compared to when a human driver directly drives a vehicle, autonomous driving requires less judgment or emotion from the human driver. Therefore, it is expected that the incidence of car accidents will decrease significantly when the technology for autonomous driving has advanced further and self-driving vehicles have become more common.

Even though the likelihood of a car accident is reduced by the technology for autonomous driving, there are situations where it is difficult to avoid a car accident. For example, someone else's vehicle could suddenly cut in, a road surface could be slippery, etc.

The most important consideration in the spread of autonomous vehicles is the safety of occupants. That is, a car accident should not occur even without the intervention of an occupant. For fully autonomous driving, a technology to guarantee the safety of occupants is required.

With regard to the prevention of car accidents, controlling the speed of a vehicle is very important. This is because an unexpected situation where another vehicle suddenly cuts in, another vehicle in front suddenly brakes, etc. can occur at any time. In order to prevent an automobile accident due to such an unexpected situation, it is necessary to control the speed of a vehicle. It is necessary to limit the speed of a vehicle so that braking can be performed safely even on a slippery road surface. This is because a braking distance is longer when a road surface is slippery. Moreover, it is necessary to control the speed of an autonomous vehicle based on whether there are other vehicles around the vehicle, road conditions, input signals from occupants, weather conditions, driving conditions, etc.

SUMMARY

Therefore, in order to solve such problems, the present disclosure is aimed primarily at providing a method and an apparatus for controlling the speed of an autonomous vehicle to prevent a car accident.

In addition, the present disclosure is aimed primarily at improving the driving safety of autonomous vehicles and providing a comfortable ride to occupants by controlling the speed of an autonomous vehicle depending on circumstances.

As described above, it may be possible to prevent automobile accidents by the method and apparatus for controlling the speed of an autonomous vehicle according to an embodiment of the present disclosure.

Furthermore, it may be possible to provide a comfortable ride to occupants.

DETAILED DESCRIPTION

Figure 1:
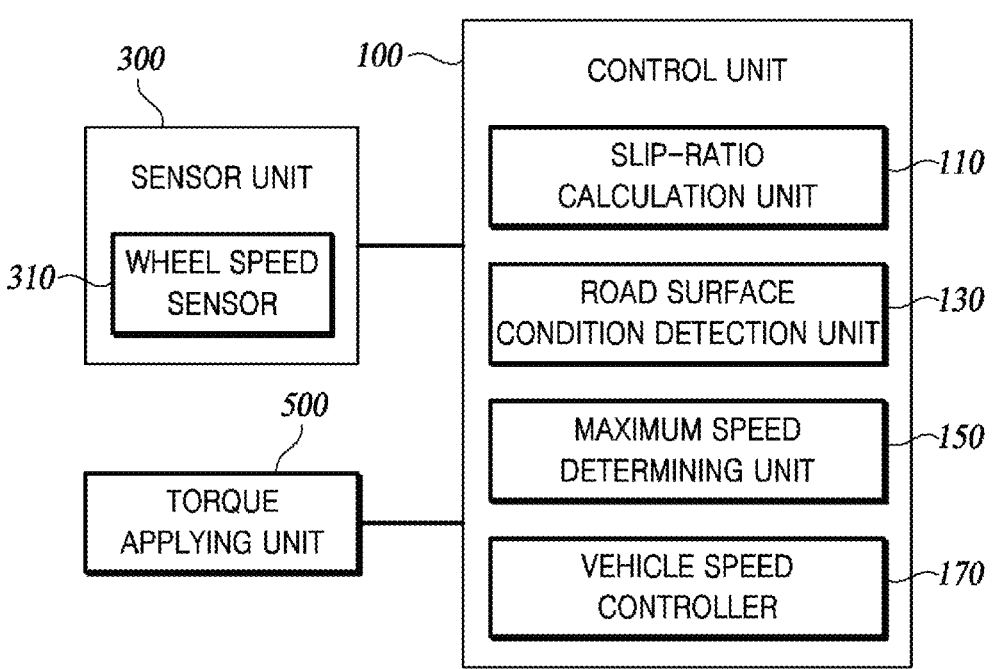
FIG. 1 is a block diagram of functions of an apparatus for controlling the speed of an autonomous vehicle according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a block diagram of functions of an apparatus for controlling the speed of an autonomous vehicle according to an embodiment of the present disclosure.

Referring to FIG. 1, the apparatus for controlling the speed of an autonomous vehicle 1 (hereinafter, referred to as an "apparatus for controlling the speed of a vehicle") may include all or some of a sensor unit 300, a torque applying unit 500, a memory (not shown), and a control unit 100.

The sensor unit 300 may include wheel speed sensors 310 provided on a plurality of wheels. The sensor unit 300 may include the plurality of wheel speed sensors 310. The wheel speed sensors 310 may measure the speed of a wheel. The wheel speed sensors 310 may be provided on both front and rear wheels. That is, the wheel speed sensor 310 may measure the speed of each of a plurality of wheels. The sensor unit 300 may transmit information about the measured speed of a wheel to the control unit 100.

The torque applying unit 500 may receive a driving signal or a braking signal from the control unit 100. The torque applying unit 500 may apply wheel torque to a wheel based on the driving signal or the braking signal. Here, the wheel torque may mean braking torque or driving torque applied to wheels of a vehicle. The braking torque is torque for braking a vehicle. The driving torque is torque for driving a vehicle.

Examples of apparatuses capable of generating braking torque include an electro mechanical brake (EMB), a hydraulic braking apparatus, a regenerative braking apparatus, a parking brake, an electronic parking brake (EPB), etc. The torque applying unit 500 may include an apparatus capable of generating braking torque to a wheel of a vehicle. Components that the torque applying unit 500 may include are not limited to the above-mentioned examples. A driving motor (not shown) of an electric vehicle (not shown) may generate braking torque as well as driving torque. This is because it is possible to perform regenerative braking using the driving motor.

The control unit 100 may control the speed of a vehicle by generating a driving signal or a braking signal. The control unit 100 may include all or some of a slip-ratio calculation unit 110, a road surface condition detection unit 130, a maximum speed determining unit 150, and a vehicle speed controller 170. According to some aspects, the control unit 100 and/or the components thereof may be implemented by circuits and/or an instruction in a form of software stored in a storage of the controller. When a processor of the control unit 100 or the components thereof reads and executes the software, the processor of the control unit 100 or the components thereof may be configured to perform the corresponding operations.

The slip-ratio calculation unit 110 may calculate a slip-ratio of a wheel based on the speed of the wheel. The slipping means that a wheel spins due to a driving force greater than an adhesion force between the wheel and a road surface. The slipping results in a difference between the speed of a vehicle and the speed of a wheel. The slip ratio indicates how much a wheel slips. The slip ratio can be expressed as shown in Equation 1 or Equation 2.

$$slip\ ratio = \frac{(speed\ of\ vehicle - speed\ of\ wheel)}{speed\ of\ vehicle} \qquad [Equation\ 1]$$

-continued $$slip\ ratio = \frac{(speed\ of\ wheel - speed\ of\ vehicle)}{speed\ of\ wheel} \qquad [Equation\ 2]$$

Figure 2:
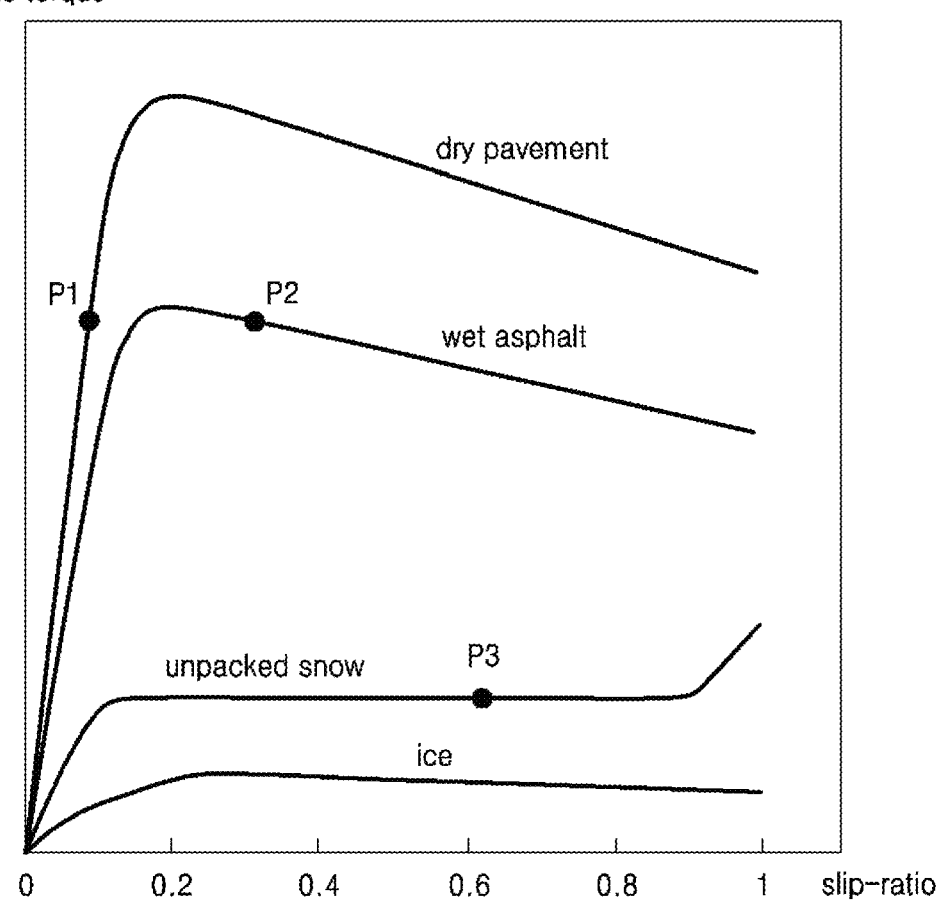
FIG. 2 is a map showing a correlation between road surface condition, a slip ratio, and braking torque.

FIG. 2 is a map showing a correlation between road surface condition, a slip ratio, and braking torque.

Referring to FIGS. 1 and 2, the road surface condition detection unit 130 may determine road surface condition based on wheel torque and a slip ratio. Here, the wheel torque refers to braking torque or driving torque applied to wheels of a vehicle. Here, road surface condition may be classified according to a friction coefficient of a road surface. The dry pavement, the wet asphalt, the unpacked snow, and the ice in FIG. 2 are only examples. The road surface condition that can be determined by the apparatus for controlling the speed of a vehicle 1 is not limited to the examples in FIG. 2.

According to an embodiment of the present disclosure, the road surface condition detection unit 130 may determine road surface condition using a map showing a correlation between road surface condition, a slip ratio, and braking torque. For example, the same braking torque is applied to P1, P2 and P3 in FIG. 2. As shown in FIG. 2, even when the same braking torque is applied, positions output on the map may vary depending on road surface condition (P1, P2, and P3). That is, the road surface condition detection unit 130 may determine road surface condition based on braking torque applied to a wheel and a slip ratio. According to the same principle, the road surface condition detection unit 130 may determine road surface condition based on driving torque applied to a wheel and a slip ratio.

The apparatus for controlling the speed of a vehicle 1 may include a memory (not shown). According to an embodiment of the present disclosure, the memory may store a map showing a correlation between road surface condition, wheel torque, and a slip ratio. Here, the wheel torque means braking torque or driving torque. According to an embodiment of the present disclosure, the memory may store a map showing a correlation between road surface condition, a braking force coefficient, and a slip ratio. According to an embodiment of the present disclosure, the memory may store a look-up table (not shown) outputting information on road surface condition when wheel torque and a slip ratio are input.

According to an embodiment of the present disclosure, the road surface condition detection unit 130 may determine road surface condition based on the look-up table. Using the look-up table, it may be possible to quickly determine road surface condition. As road surface condition is determined more quickly, driving stability is increased.

Figure 3:
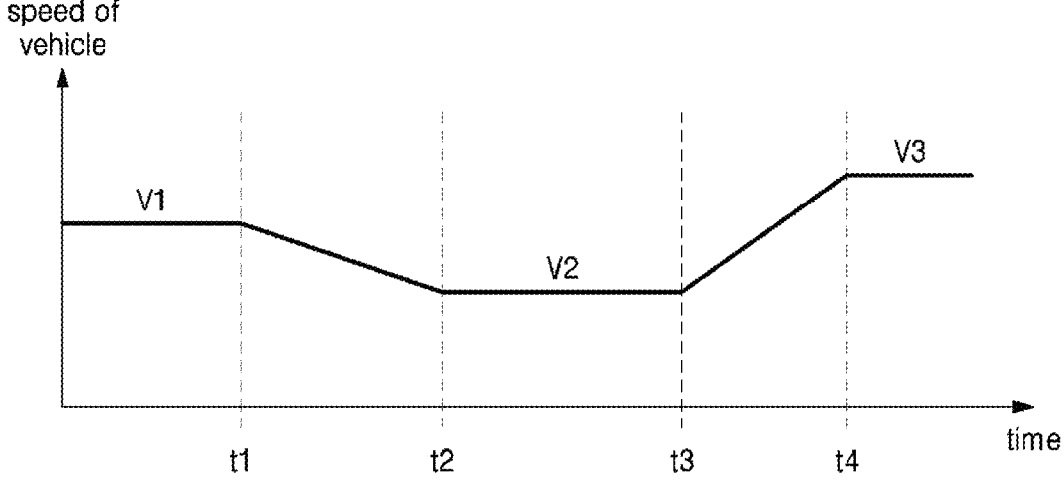
FIG. 3 is a graph illustrating how the speed of a vehicle changes over time when the speed of the vehicle is controlled.

FIG. 3 is a graph illustrating how the speed of a vehicle changes over time when the speed of the vehicle is controlled.

Referring to FIGS. 3 and 1, the maximum speed determining unit 150 may determine the maximum speed of a vehicle based on road surface condition. The vehicle speed controller 170 may control the speed of a vehicle not to exceed maximum speed. For example, when a friction coefficient of a road surface decreases at time t1, the maximum speed determining unit 150 may adjust maximum speed to value V2 based on road surface condition. In this case, the vehicle speed controller 170 may control the speed of a vehicle to have a value less than or equal to value V2. When a friction coefficient of a road surface rises at time t3, the maximum speed determining unit 150 may adjust maximum speed to value V3 based on road surface condition. In this case, the vehicle speed controller 170 may control the speed of a vehicle to have a value less than or equal to value V3.

According to an embodiment of the present disclosure, the maximum speed determining unit 150 may lower maximum speed as a friction coefficient of a road surface decreases. This is because the likelihood of slipping rises as a friction coefficient of a road surface decreases. The probability of a traffic accident can be reduced by restricting the maximum speed of a vehicle.

According to an embodiment of the present disclosure, the maximum speed determining unit 150 may operate only when a friction coefficient of a road surface is less than a threshold value. This is because there is no need to limit the speed of a vehicle when a friction coefficient is large enough to prevent slipping.

According to an embodiment of the present disclosure, the maximum speed determining unit 150 may determine the maximum speed of a vehicle based on whether there is an object in front of the vehicle or an input signal from an occupant. Specifically, when there is an object in front of a vehicle, the maximum speed determining unit 150 may determine the value of maximum speed based on a distance between the vehicle and the object. The maximum speed determining unit 150 may lower the maximum speed as the distance between the vehicle and the object decreases.

The vehicle speed controller 170 may control the speed of a vehicle not to exceed maximum speed. According to an embodiment of the present disclosure, the vehicle speed controller 170 may operate only when a friction coefficient is less than a threshold value. This is because there is no need to limit the speed of a vehicle when a friction coefficient is large enough to prevent slipping.

According to an embodiment of the present disclosure, when the speed of a vehicle exceeds maximum speed, the vehicle speed controller 170 may reduce the speed of the vehicle to the maximum speed and then maintain the maximum speed. According to an embodiment of the present disclosure, when the speed of a vehicle is below maximum speed, the vehicle speed controller 170 may increase the speed of the vehicle to the maximum speed and then maintain the maximum speed.

According to an embodiment of the present disclosure, while a vehicle is accelerating or decelerating, the vehicle speed controller 170 may control the acceleration of the vehicle to be constant. When the acceleration of a vehicle is constant, the speed of the vehicle may increase or decrease at a constant rate over time. In the section between time t1 and time t2 in FIG. 3, acceleration may be constant so that the speed of a vehicle may decrease linearly, and, in the section between time t3 and time t4 in FIG. 3, the acceleration may be constant so that the speed of the vehicle may rise linearly.

It may be possible for the vehicle speed controller 170 to control the amount of acceleration. In a section where the speed of a vehicle is controlled, the speed of the vehicle may change more quickly as the amount of acceleration is higher, thereby reducing the risk of a car accident. The speed of the vehicle may change more slowly as the amount of acceleration is lower, thereby improving the riding comfort.

According to an embodiment of the present disclosure, the vehicle speed controller 170 may determine the amount of acceleration based on whether there is an object in front of a vehicle or an input signal from an occupant. Specifically, the vehicle speed controller 170 may determine the amount of acceleration based on a distance between a vehicle and an object when there is the object in front of the vehicle.

According to an embodiment of the present disclosure, the vehicle speed controller 170 may increase the amount of acceleration as a distance between a vehicle and an object decreases. This is because the faster change in speed is required as the distance between the vehicle and the object decreases.

According to an embodiment of the present disclosure, the vehicle speed controller 170 may lower acceleration as a friction coefficient decreases.

Figure 4:
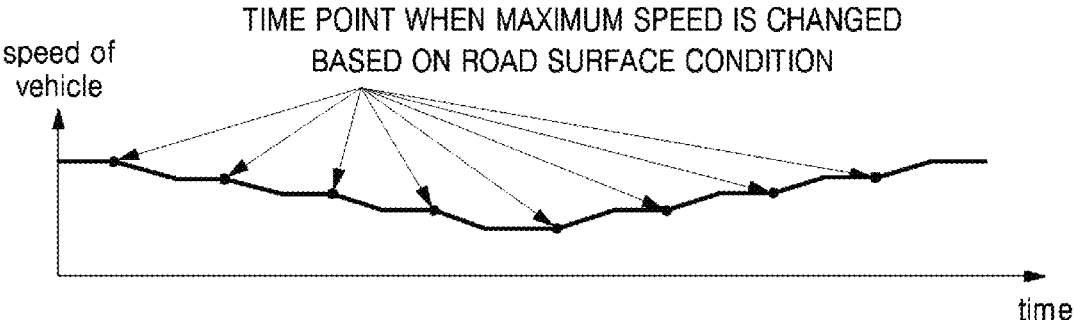
FIG. 4 is a graph illustrating an embodiment where the apparatus for controlling the speed of a vehicle changes the speed of a vehicle.

FIG. 4 is a graph illustrating an embodiment in which the apparatus for controlling the speed of a vehicle changes the speed of a vehicle.

Referring to FIG. 4, when road surface condition changes frequently, the maximum speed determining unit 150 may frequently change the maximum speed of a vehicle. When road surface condition does not change frequently, the maximum speed determining unit 150 may not frequently change the maximum speed of a vehicle.

As road surface condition is more subdivided, the apparatus for controlling the speed of a vehicle 1 may change the speed of a vehicle more frequently. As the apparatus for controlling the speed of a vehicle 1 changes the speed of a vehicle more frequently, the amount of acceleration may decrease. As the amount of acceleration decreases, the ride comfort may improve.

The road surface condition detection unit 130 may determine road surface condition in real time. When the road surface condition detection unit 130 determines road surface condition in real time, the maximum speed determining unit 150 may determine the maximum speed of a vehicle in real time. The vehicle speed controller 170 may control the speed of a vehicle in real time so that the speed of the vehicle does not exceed the maximum speed. It may be possible for the apparatus for controlling the speed of a vehicle 1 to decrease the amount of acceleration when the speed of a vehicle is frequently changed, thereby enhancing the riding comfort.

Figure 5:
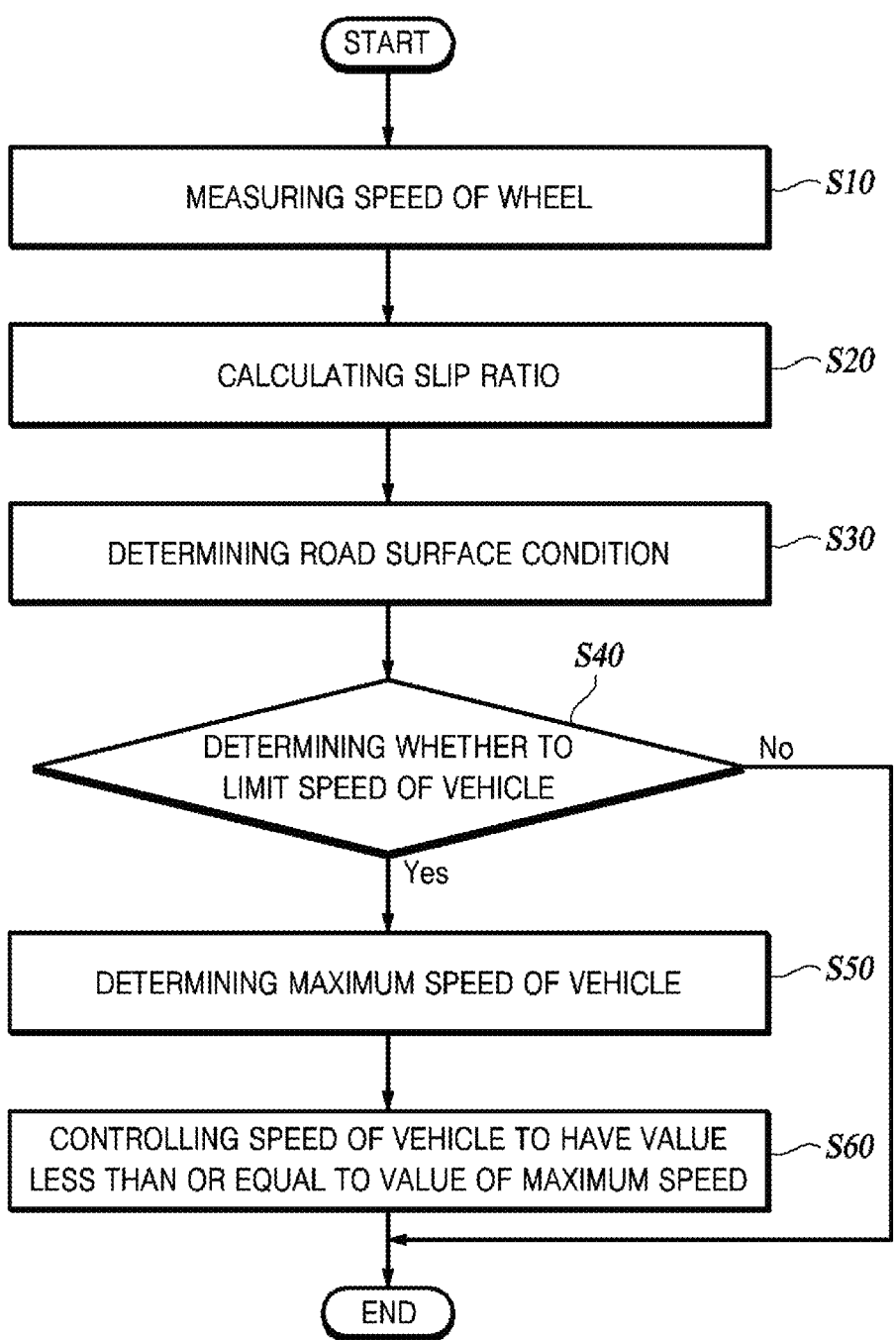
FIG. 5 is a flowchart illustrating a method of controlling the speed of an autonomous vehicle according to an embodiment of the present disclosure.

FIG. 5 is a flowchart illustrating a method of controlling the speed of an autonomous vehicle according to an embodiment of the present disclosure.

Referring to FIG. 5, the apparatus for controlling the speed of a vehicle 1 may measure the speed of wheels of a vehicle at S10. The apparatus for controlling the speed of a vehicle 1 may use the wheel speed sensor 310 to measure the speed of the wheels. The plurality of wheel speed sensor 310 may be used. The wheel speed sensor 310 may transmit information about the measured speed of the wheels to the control unit 100. The apparatus for controlling the speed of a vehicle 1 may calculate a slip ratio based on the speed of the wheels of the vehicle at S20. The slip ratio is a ratio indicating the degree of slipping of a wheel.

The apparatus for controlling the speed of a vehicle 1 may determine road surface condition based on torque applied to the wheels of the vehicle and the slip ratio at S30. Here, road surface condition may be classified according to a friction coefficient of a road surface. The apparatus for controlling the speed of a vehicle 1 may determine road surface condition by using a look-up table or a map showing a correlation between road surface condition, a slip ratio, and wheel torque.

The apparatus for controlling the speed of a vehicle 1 may determine whether to limit the speed of the vehicle based on the road surface condition at S40. The apparatus for controlling the speed of a vehicle 1 may limit the maximum speed of the vehicle only when a friction coefficient of a road surface is less than a threshold value. This is because there is no need to limit the speed of a vehicle when a friction coefficient of a road surface is large enough to prevent slipping.

The apparatus for controlling the speed of a vehicle 1 may determine the maximum speed of the vehicle based on the road surface condition at S50. The apparatus for controlling the speed of a vehicle 1 may lower the maximum speed as a friction coefficient of a road surface decreases. This is because the likelihood of slipping rises as a friction coefficient of a road surface decreases. The apparatus for controlling the speed of a vehicle 1 may lower the maximum speed as the distance between the vehicle and an object decreases. This is because the likelihood of a car accident diminishes as the speed of a vehicle decreases.

The apparatus for controlling the speed of a vehicle 1 may control the speed of the vehicle to have a value less than or equal to the value of the maximum speed at S60. The apparatus for controlling the speed of a vehicle 1 may control the acceleration of the vehicle to be constant while the vehicle is accelerating or decelerating. The apparatus for controlling the speed of a vehicle 1 may increase the amount of acceleration as the distance between the vehicle and an object decreases. This is because the faster change in speed is required as the distance between the vehicle and the object decreases.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An apparatus for controlling a speed of an autonomous vehicle, comprising:

a sensor unit for measuring a speed of a wheel of the vehicle;

a control unit for controlling the speed of the vehicle by generating a driving signal or a braking signal; and a torque applying unit for applying wheel torque to the wheel based on the driving signal or the braking signal, wherein the control unit configured to calculate a slip ratio based on the speed of the wheel, determine a road surface condition from a plurality of road surface conditions, based on a correlation among the plurality of road surface conditions, the wheel torque, and the slip ratio, determine a maximum speed of the vehicle based on the determined road surface condition, and control the speed of the vehicle not to exceed the maximum speed, the determined road surface condition is classified according to a friction coefficient of the road surface, the wheel torque is braking torque or driving torque applied to the wheel, and when the speed of the vehicle is below the maximum speed, the control unit is configured to increase the speed of the vehicle to the maximum speed and then maintain the speed of the vehicle at the maximum speed.

2. The apparatus of claim 1, wherein the control unit includes a slip-ratio calculation unit configured to calculate the slip ratio based on the speed of the wheel, a road surface condition detection unit configured to determine the road surface condition from the plurality of road surface conditions, based on the correlation among the plurality of road surface conditions, the wheel torque, and the slip ratio, a maximum speed determining unit configured to determine the maximum speed of the vehicle based on the determined road surface condition, and a vehicle speed controller configured to control the speed of the vehicle not to exceed the maximum speed.

3. The apparatus of claim 2, wherein the maximum speed determining unit and the vehicle speed controller operate only when the friction coefficient is less than a threshold value.

4. The apparatus of claim 2, wherein the vehicle speed controller controls an acceleration of the vehicle to be constant while the vehicle is accelerating or decelerating.

5. The apparatus of claim 4, wherein an amount of the acceleration is determined based on whether there is an object in front of the vehicle or an input signal from an occupant.

6. The apparatus of claim 5, wherein, when there is the object in front of the vehicle, the amount of the acceleration is determined based on a distance between the vehicle and the object.

7. The apparatus of claim 6, wherein the amount of the acceleration is increased as the distance between the vehicle and the object decreases.

8. The apparatus of claim 2, wherein the maximum speed determining unit reduces the maximum speed as the friction coefficient of the road surface decreases.

9. The apparatus of claim 2, wherein the maximum speed determining unit determines the maximum speed based on whether there is an object in front of the vehicle or an input signal from an occupant.

10. The apparatus of claim 9, wherein, when there is the object in front of the vehicle, the maximum speed is reduced as a distance between the vehicle and the object decreases.

11. The apparatus of claim 1, wherein the control unit controls an acceleration of the vehicle to be constant while the vehicle is accelerating or decelerating.

12. The apparatus of claim 1, wherein the control unit reduces the maximum speed as the friction coefficient of the road surface decreases.

13. The apparatus of claim 1, wherein the control unit determines the maximum speed based on whether there is an object in front of the vehicle or an input signal from an occupant.

14. A method of controlling a speed of an autonomous vehicle, comprising:

measuring a speed of a wheel of the vehicle;

calculating a slip ratio based on the speed of the wheel;

determining a road surface condition from a plurality of road surface conditions, based on a correlation among the plurality of road surface conditions, torque applied to the wheel of the vehicle, and the slip ratio;

determining a maximum speed of the vehicle based on the determined road surface condition;

controlling the speed of the vehicle to have a value less than or equal to the value of the maximum speed; and when the speed of the vehicle is below the maximum speed, the control unit is configured to increase the speed of the vehicle to the maximum speed and then maintain the speed of the vehicle at the maximum speed, wherein the determined road surface condition is classified according to a friction coefficient of the road surface, and the torque applied to the wheel of the vehicle is braking torque or driving torque.

* * * * *